*Fig_4*

*Fig_5*

*Fig_6*

*Fig_3*

*Fig_9*

*Fig_7*

*Fig_8*

INVENTOR.
HADLEY R. BRAMEL

BY

*ATTORNEY*

Aug. 18, 1964  H. R. BRAMEL  3,144,773
SEDIMENTATION APPARATUS AND METHOD FOR DETERMINING
PARTICLE SIZE DISTRIBUTION
Filed Dec. 26, 1962  3 Sheets-Sheet 3

| (1) | AXIAL SEDIMENTATION PERIODS | | | | | | | | |
|---|---|---|---|---|---|---|---|---|---|
| | 20 SECONDS | | | 5 MINUTES | | | 1 HOUR | | |
| | (2) | (3) | (4) | (5) | (6) | (7) | (8) | (9) | (10) |
| SEGMENT FROM BASE | WEIGHT GRAMS | % OF ORIGINAL WEIGHT | SIZE MICRONS | WEIGHT GRAMS | % OF ORIGINAL WEIGHT | SIZE MICRONS | WEIGHT GRAMS | % OF ORIGINAL WEIGHT | SIZE MICRONS |
| 0-1 | .1006 | | | .3584 | | | .4093 | | |
| 1-2 | .0533 | 100.9 | 128.0 | .0221 | 51.1 | 31.1 | | | 9.13 |
| 2-3 | .0533 | 100.9 | 122.0 | .0194 | 44.8 | 29.7 | .0065 | 16.7 | 8.71 |
| 3-4 | .0532 | 100.7 | 115.0 | .0177 | 40.9 | 28.2 | .0060 | 15.4 | 8.25 |
| 4-5 | .0522 | 98.9 | 109.0 | .0174 | 40.2 | 26.5 | .0056 | 14.4 | 7.80 |
| 5-6 | .0530 | 100.2 | 102.0 | .0174 | 40.2 | 24.9 | .0054 | 13.9 | 7.29 |
| 6-7 | .0524 | 99.0 | 94.2 | .0156 | 36.1 | 23.0 | .0053 | 13.6 | 6.74 |
| 7-8 | .0521 | 98.7 | 86.1 | .0132 | 30.5 | 21.0 | .0044 | 11.3 | 6.15 |
| 8-9 | .0510 | 96.4 | 77.5 | .0115 | 26.6 | 18.8 | .0041 | 10.5 | 5.51 |
| 9-10 | .0471 | 89.2 | 66.6 | .0100 | 23.1 | 16.2 | .0039 | 10.0 | 4.75 |
| 10-11 | .0389 | 73.6 | 54.4 | .0086 | 19.9 | 13.3 | .0032 | 8.2 | 3.90 |
| 11-12 | .0273 | 51.7 | 38.5 | .0083 | 19.2 | 9.84 | .0008 | | 2.76 |
| SUM | .6344 | $\frac{.6344}{12}=.0529$ | | .5196 | $\frac{.5196}{12}=.0433$ | | .4545 | $\frac{.4545}{12}=.0389$ | |

INVENTOR.
HADLEY R. BRAMEL
BY Harvey J. Lawhurst
ATTORNEY

United States Patent Office 3,144,773
Patented Aug. 18, 1964

3,144,773
SEDIMENTATION APPARATUS AND METHOD FOR DETERMINING PARTICLE SIZE DISTRIBUTION
Hadley R. Bramel, 80 Amador Ave., Atherton, Calif.
Filed Dec. 26, 1962, Ser. No. 246,974
17 Claims. (Cl. 73—432)

This invention relates generally to an apparatus and a method for determining the particle size distribution of a powdery material or the like, and more particularly to a sedimentation apparatus and a method for separating small solid particles, dispersed uniformly in a liquid, into regions having preselected size distributions and arresting sedimentation thereafter for determining the particle size distribution of the powdery material or the like, This invention is particularly useful as a laboratory method for the determination of the particle size distribution of powdery materials such as pulverized minerals, clay, dust, certain food stuff, ceramic material, cement products, paint pigments, chemical powders, metallic powders, abrasives, and many other industrial products. For many applications, a determination of the particle size distribution of such powdery materials has been found absolutely necessary and the apparatus and method hereinafter to be described provides a practical, fast and efficient means therefor and is admirably suited for providing data from which the presence and percentages by wieght of different particle sizes may be determined. The term powdery material is defined in here as solid matter comprised of particles whose size is less than 250 microns.

There are a number of devices presently being utilized for determining particle size distribution of a powdery material employing sedimentation to effect a separation of particles by size. One prior art method, commonly known as the Oden method or sedimentation balance method, utilizes the pressure drop at the base of a sedimentation column to yield the size distribution data. This method, apparently no longer used, was rather complex requiring almost constant attendance and often yielding data which were inconsistent and incorrect.

Another method in common use today is the Andreason pipette method regarded, perhaps, as the standard sedimentation method for yielding particle size distribution data. The Andreason method utilizes a sedimentation vessel equipped with a series of tubes which dip into the sedimentation column by carefully measured lengths. Each tube is terminated at its top by a system of multichannel valves. At specified intervals, aliquot samples are drawn off by suction and deposited in separate receptacles. The contents of these receptacles must be filtered, dried, and weighted and, if permissible, burned over a flame to yield the weight of each sample which provides the data from which particle size distribution is determined.

The Andreason method also requires nearly constant attendance by an operator and involves much supplementary analytical work and lengthy calculations. Furthermore, this method is prone to give erroneous results unless the utmost care is exercised. One source, which often leads to misleading results is the requirement that, prior to removing samples by suction, the solid particles must be evenly and uniformly dispersed throughout the sedimentation vessel. This is usually accomplished by violent shaking which creates many vortices and bubbles which require time to rise to the surface.

The time period elapsing after violently shaking the sedimentation vessel and before the liquid comes to rest is usually arbitrary and is not counted in setting the subsequent time periods for withdrawal of the aliquot samples. As a result of waiting until the vortices have died out and the bubbles have been discharged, the dispersed solid particles will have started to settle, due to sedimentation, causing the method to commence with a non-uniform dispersion resulting in data which do not properly reflect the particle size distribution of the powdery material.

It is therefore a primary object of this invention to provide a new and novel apparatus and method for determining the particle size distribution of a powdery material which is more accurate, less complex and more economical then has been possible heretofore.

It is also another object of this invention to provide a homogeneous dispersion of small particles of different sizes throughout the volume of a sedimentation tube.

It is a further object of this invention to provide a means and method useful for deriving data from which the particle size distribution of a powdery material, comprising small particles, may be easily determined and which is not subject to the uncertainties and inaccuracies occasioned by the time necessary to permit the dispersion fluid to come, from a state of violent agitation, to a state of complete rest.

It is still another object of this invention to provide a means and a method for the particle sedimentation of dispersed particles for a selected time interval and thereafter to arrest such sedimentation so that the distribution of particles at the end of the selected time interval may be determined. The relative weights of equal length portions of the sedimentation tube provide the desired data for determining particle size distribution.

It is also an object of this invention to provide a means and a method for obtaining a uniform dispersion of small particles throughout a dispersion liquid, allowing the dispersed particle to drop a preselected distance for a preselected size under gravity to form a non-uniform dispersion which is characteristic of the present particle sizes, arresting any further dropping of the particles to fix this characteristic distribution, and comparing the relative weights of particles within zones of equal length to derive data from which the particle size distribution may be obtained.

It is also an object of this invention to provide an improved means and method for determining particle size distribution of a powdery material.

In accordance with a preferred embodiment of this invention, a sample of the powdery material, whose particle size distribution is to be determined, is introduced into a circulatory fluid system. The fluid is then circulated to disperse the powdery material uniformly by fluid motion. The circulatory fluid system includes a vertical section having an accurately bored vertical sedimentation tube sealable on top and bottom ends and retractable extension above and below the sedimentation tube.

After the powdery material is uniformly dispersed through the circulating fluid, the fluid flow is brought to rest by shutting off the pump. Thereafter, the fluid is permitted to remain standing for a carefully controlled period until all vortices have died out at which time the sedimentation tube is sealed. Because of the upper and lower extension, the dispersion retains its uniformity along the length of the sedimentation tube. After sealing, the sedimentation tube is permitted to stand for a selected time interval so that sedimentation takes place in the sedimentation tube. The time interval is selected to obtain a known distribution of particles, i.e., until a selected particle size has dropped a selected distance.

Thereafter, sedimentation is suddenly arrested by turning the sedimentation tube to a horizontal position in which position it is left until all particles have settled radially to form a ribbon along the length of the tube. The ribbon is dried and cut into portions of equal length. These portions are weighed, which weight provides the date from which particle size distribution is determined.

Other objects and a better understanding of the invention may be had by reference to the following description, taken in conjunction with the accompanying drawings, in which.

Figure 1:
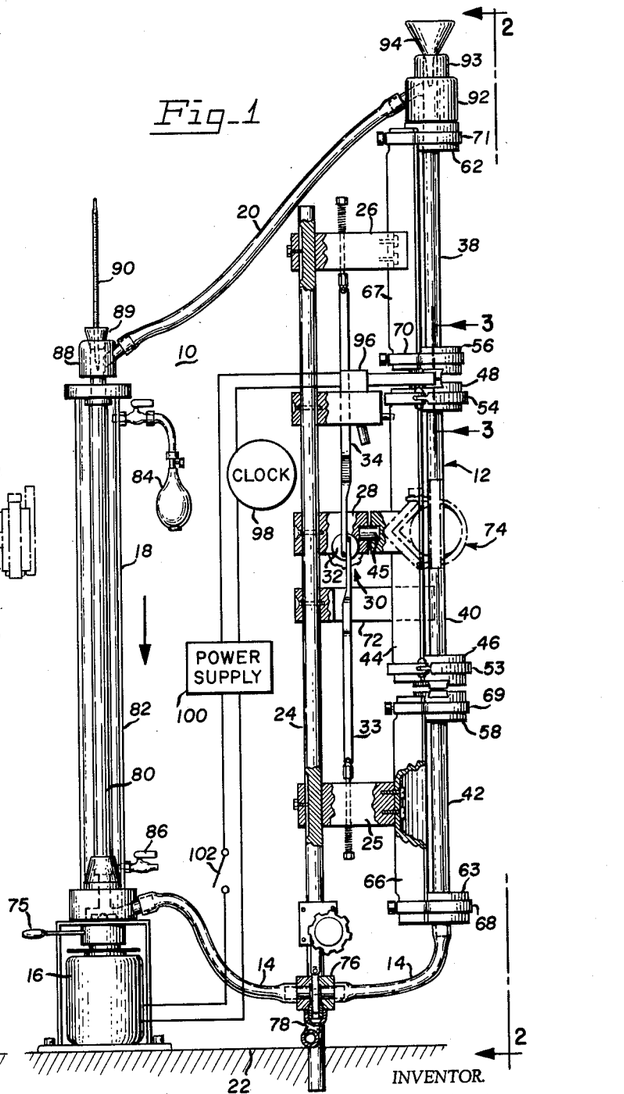
FIG. 1 is a side elevational view of the sedimentation apparatus of this invention.
Figure 2:
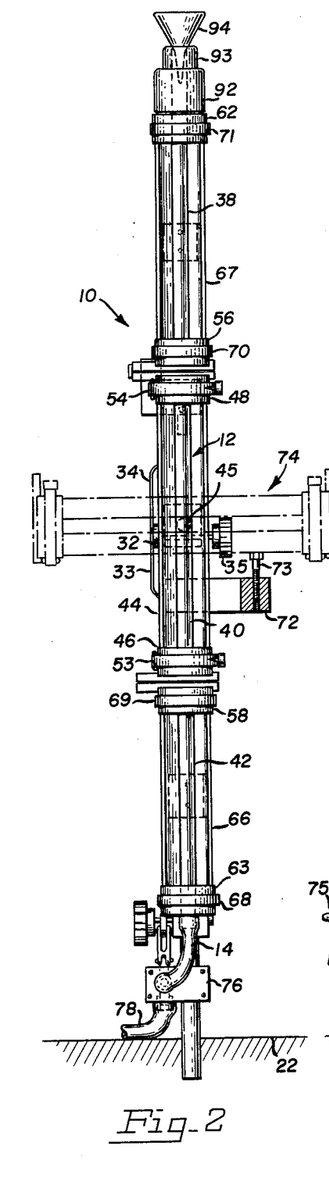
FIG. 2 is a view taken along line 2—2 of FIG. 1.
Figures 3, 6, 7, 8, 9:
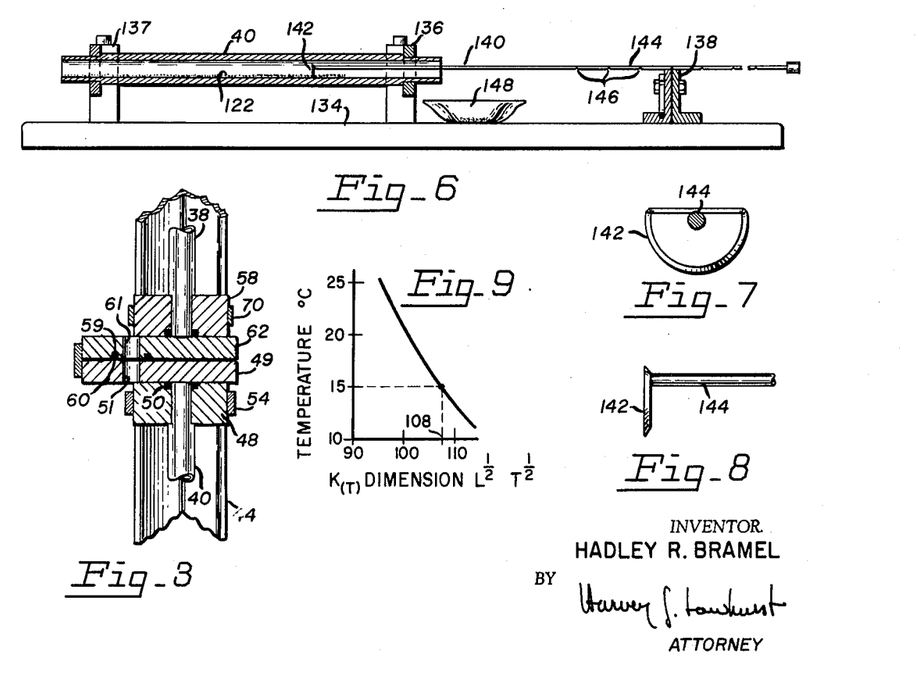
FIG. 3 is a cross sectional view taken along line 3—3 of FIG. 1.
FIG. 6 is an elevational view, partly in cross section of the sedimentation tube on a horizontal cutting table for cutting the ribbon.
FIG. 7 is an end view of the cutting hoe shown in FIG. 6.
FIG. 8 is an enlarged elevational view of the blade portion of the cutting hoe shown in FIG. 6.
FIG. 9 is a graph having a curve showing the variation of terminal velocity of a small particle with temperature.

Referring now to the drawing, and particularly to FIGS. 1 to 3 thereof, there is shown an embodiment of the sedimentation apparatus of this invention designated by reference character 10. Sedimentation apparatus 10 comprises essentially a closed loop circulatory fluid system including a vertical tube portion generally indicated as 12 connected at its lower end by means of connecting tubing 14 to a pumping means 16. Pumping means 16 is connected through a double walled tube 18 and a connecting tube 20 to the upper end portion of vertical tube portion 12.

Circulatory system 10 is generally supported upon a base 22. More particularly, base 22 directly supports a vertical column 24 and pumping means 16. Pumping means 16 supports double walled tube 18 and vertical column 24 supports vertical portion 12 by means of a pair of slidable brackets 25 and 26 and a stationary bracket 28.

There is also provided a linkage mechanism 30 which includes a disc, pivotally mounted to stationary bracket 28 having a pair of eccentrically placed and diametrically opposed pivot pins, to which the ends of a pair of rods 33 and 34 are connected. The other end of rods 33 and 34 are respectively connected to slidable brackets 25 and 26 so that when disc 32 is rotated, sliding brackets 25 and 26 move in opposite directions away from fixed bracket 28. A handle 35 may be connected to the shaft to which disc 32 is mounted to facilitate actuation of linkage mechanism 30.

Vertical tube portion 12 comprises three aligned tubular sections which are respectively upper tube 38, center tube 40 and lower tube 42. Center tube 40 comprises a precision bore tube 42 which may be made of glass and which will also be referred to as the sedimentation tube. Upper and lower tubes 38 and 42 may likewise be precision bored glass tubes.

Sedimentation tube 40 is pivotally mounted to stationary bracket 28 by being clamped, at opposite ends, to a generally V-shaped bracket 44. More particularly, bracket 44 is pivotally mounted to stationary bracket 28 by means of pivot pin 45. Sedimentation tube 40 is provided at opposite ends with a pair of slide valves 46 and 48 which, when closed, fluid tightly seal the inner bore of tube 40.

Each slide valve includes a valve element, designated respectively 47 and 49, which seals tube 40 in the closed position as best shown in FIG. 3. A conventional O-ring 50 provides the actual seal between the valve body and valve element 49. The valve is shown in the closed position and is open when bore 51 of valve element 49 is aligned with the bore of tube 40.

Valve 46 is similar in all respects to valve 48 and provides a means for closing the lower end of tube 40. Tube 40 is mounted to bracket 44 by means of a pair of clamps or bands 53 and 54 which engage the outer peripheral portion of the bodies of valves 46 and 48 and clamp to the ends of bracket 44. Removal of bands 53 and 54 will permit ready removal of sedimentation tube 40 together with valves 46 and 48.

The lower end of upper tube 38 and the upper end of lower tube 42 are likewise capped with slide valves 56 and 58 respectively which may be alike in all respects to slide valve 48 except that they are provided with a recess 59 accommodating an O-ring 60 concentric with bore 61 and valve element 62 as best seen in FIG. 3, to provide a fluid tight seal between adjacent valve bodies. The other ends of upper tube 38 and lower tube 42 are inserted into spacers 62 and 63 which may be configured similarly to a slide valve in the open position.

V-shaped brackets 66 and 67 are respectively rigidly mounted to slidable brackets 25 and 26 and may be of the same general form and in alignment with bracket 44. Lower tube 42 is clamped to bracket 66 by bands 68 and 69 which engage valve 58 and spacer 63 and upper tube 38 is clamped to bracket 67 by bands 70 and 71 which engage valve 56 and spacer 62. As will become clearer in the ensuing description, lower tube 42 and upper tube 38 need not be detachably clamped since they are normally not removed from the sedimentation apparatus 10 during the operation of this invention.

In order to ensure a smooth, even fluid flow through vertical section 12 it is important that proper alignment between upper tube 38, sedimentation tube 40 and lower tube 42, is maintained when valves 46, 58 and 56, 54 are in their open position. Without proper alignment, unnecessary turbulance is set up and further, as will become better understood in connection with the theory of operation of this invention, axial sedimentation is disturbed by deposits on edge portions resulting in inaccuracies of particle size determination.

It is also seen from the arrangement so far described that rotating actuating knob 35, brackets 26 and 25 respectively, slide up and down thereby respectively raising and lowering tubes 38 and 42 of the upper and lower end of sedimentation tube 40. Before operating actuating mechanism 30, slide valves 46, 48, 56 and 58 are closed so that sedimentation tube 40 is fluid tightly sealed at both ends and tubes 38 and 42 are fluid tightly sealed at their ends adjacent to tube 42. Raising and lowering tubes 38 and 42 frees sedimentation tube 40 for rotation about pivot pin 45. There is also provided a stationary bracket 72 mounted to column 24 having a stop member 73 whose upper surface is adjusted to support sedimentation tube 40 in an exact horizontal position when the same is rotated as shown by dashed lines at 74.

Pumping means 16, which may be an electrically driven centrifugal pump includes a friction control switch 75 to adjust pumping speed, has its outflow passage directly connected to lower tube 42 through flexible tube 14. Flexible tube 14 includes a valving means 76 for draining the fluid in the circulatory system to a drain tube 78.

The inflow passage of pumping means 16 is communicated with flexible tube 20 through a variable volume flow passage to complete the circulatory flow system. The variable volume flow passage comprises an inner tube 80 of plastic or the like and an outer jacket 82 sealed at both ends with respect to the outer surface of inner tube 80. The space between inner tube 80 and outer jacket 82 may be pressurized by a pumping means such as the manually operated pumping bag 84. Since inner tube 80 is made of plastic material or a material having elasticity or resilience or the like, pressurizing outer jacket 82 changes the fluid volume inner tube 80 accommodates so that inner tube 80 may perform the function of a reservoir to fill the fluid system after a sample is withdrawn. A relief valve 86 is provided to relieve pressure in jacket 82 so that inner tube 80 has maximum fluid capacity.

Flow passage joint 88 for coupling collapsible hose 80 to flexible tubing 20 may be shaped with a straight-through passage and a branch passage to which tubing 20 is connected. The upper position of the straight-through bore may be closed with a stopper 89 having an opening for insertion of a thermometer 90 so that the temperature of the fluid may be constantly monitored.

Flow passage joint 92 may be of the same general configuration as joint 88, i.e., having a straight-through passage communicated with upper tube 38 and a branch passage communicated with flexible tubing 20. The upper end of the straight-through passage is closed with a stopper 93 having an opening through which a funnel 94 may be inserted to add powdery material to the fluid in the system. After insertion of the powdery material, and prior to starting pumping means 16, funnel 94 is withdrawn and the upper end of the straight-through bore in joint 92 is fluid-tightly sealed.

There is also provided a switch means 96 which is connected to start a clock 98 upon being actuated. A power source 100 may be utilized to run clock 100 as well as the pump means 16. Switch 96 is activated, in the embodiment shown in FIG. 1, when valve elements 49 and 62 of slide valves 48 and 56 are closed. In this manner clock 92 starts running from the very instant of time that the upper end of sedimentation tube 40 is sealed.

As will become better understood, slide valves 48 and 56 at the upper end of sedimentation tube 40 and slide valves 46 and 58 at the lower end of sedimentation tube 40 are closed simultaneously either manually as shown or by means of relays and solenoids or the like. In case relays and solenoids are used to close all four slide valves simultaneously, the switch for actuating the slide valves may simultaneously start clock 98 running. Also a switch 102 may be provided to apply power from power supply 100 to pump 16.

Referring now to the operation of the device of this invention as shown in FIGS. 1 to 3, a sample of the powdery material, whose particle size distribution is to be determined, is introduced into funnel 94. The amount of powdery substance is usually selected to be about 1% to 3% by weight of the fluid in the circulatory system but the amount is not critical. By way of example, the circulatory system may have a fluid capacity of 300 to 400 cubic centimeters into which a sample having a weight of about 10 to 12 grams is introduced.

The fluid with which circulatory system is filled is selected so that powdery material does not dissolve therein. For most solids, water is a satisfactory fluid. To prevent flocculation, particularly with mineral matter, it has been found desirable to add a liberal amount of dispersing agent such as for example sodium hexa meta phosphate. The mixture of a suitable fluid and dispersing agent will be generally referred to as the dispersing fluid.

At the start of operations, dispersing fluid is introduced into the circulatory system through funnel 94 until the system is almost filled. Then the powdery sample is added after which the system is filled to the level of the neck of funnel 94 with more dispersing fluid. A rubber cork may then be inserted into the neck of funnel 94 or into the bore of joint 92 to seal the system without any air being trapped.

Thereafter switch 102 is closed to start the motor of pump means 16 at a low speed which is regulated by friction control means 75. As soon as all bubbles have been discharged, the pumping speed is increased until the dispersing fluid flow reaches some 2 to 3 gallons per minute and left at this circulatory rate a minute or so until the particles of the powdery substance are evenly distributed throughout the dispersing fluid.

After uniform dispersion of the powdery material in the rapidly circulating dispersion fluid, the fluid is brought to rest so that controlled sedimentation can be started. This is best done by opening switch 102 to shut off the motor of pump means 16.

Shutting off fluid flow, i.e., removing the agitation which caused the uniform dispersion, of course results in the immediate commencement of some sedimentation. Also bringing the circulating dispersion fluid to rest creates unequal disturbances of the fluid throughout the circulatory system. For this reason, after fluid flow is shut off, the system is allowed to stand for a short time period until all fluid motion ceases and all local fluid disturbances have completely died out.

This time period, also referred to as the quieting period, must be carefully selected to be sufficiently long so that the dispersion fluid has ample opportunity to come to a complete rest but must be sufficiently short so that the larger particles settling in vertical portion 12 do not traverse a distance greater than the length of upper tube 38. Since the minimum quieting time period depends on the configuration of the apparatus and the flow rate, and the maximum quieting time period depends only on the length of upper tube 38, the latter is readily extended to be of sufficient length to permit a sufficiently long quieting period as will become clearer from the ensuing description of sedimentation.

The importance of the above stated requirement concerning the minimum length of upper tube 38 is that during the quieting period the uniformity of the dispersion within sedimentation tube 40 does not change since as many particles of each size will settle from upper tube 38 into sedimentation tube 40 as will settle from sedimentation tube 40 into lower tube 42. If the quieting time is made longer than the time necessary for all particles above a certain size to settle from upper tube 38 into sedimentation tube 40 than during the time period commencing with the crossing of the last particle of said certain size into the sedimentation tube 40 until the end of the quieting period, the same sized particles continue to settle out of sedimentation tube 40 into lower tube 42 without being replenished from upper tube 38. If this happens, the dispersion within sedimentation tube 40 becomes nonuniform.

After the expiration of the proper quieting period, slide valves 46, 48, 56 and 58 are simultaneously closed and clock 96 is started. In the embodiment of FIG. 1, closure of slide valve 48 (or 56 or both) automatically closes switch 96 which starts clock 98. As a practical matter, the closing of the valves and the starting of the clock can be accomplished electrically where depressing of a switch starts the clock and actuates relays and solenoids which close each of the valves as already indicated.

Closure of the valves isolates sedimentation tube 40 from the remainder of the circulatory system, which at the time of closure, contains a uniformly dispersed powdery material. Sedimentation tube 40 is left in its vertical position for controlled axial sedimentation for a period of time which is selected in accordance with a range of particle sizes to be determined as will hereinafter be explained. This time period is also referred to as the axial sedimentation period or simply the sedimentation period.

During the sedimentation period, upper and lower tube 38 and 42 are respectively raised and lowered by turning actuating mechanism 30 so that sedimentation tube 40 is physically separated from tubes 38 and 42. After the expiration of the selected sedimentation period, sedimentation in the axial direction of tube 40 is arrested by turning tube 40 to a horizontal position as shown in FIG. 1 by dotted lines 74. Stop member 72 provides a convenient rest for tube 40 assuring a proper horizontal position so that there be no further axial sedimentation.

Upon placing tube 40 in a horizontal position, sedimentation of course continues but the direction of sedimentation is now at right angle to the sedimentation tube axis. This sedimentation will also be referred to as transverse sedimentation in contrast to axial sedimentation. Transverse sedimentation causes all particles to move to the lower inner surface of tube 40 where the particles consolidate as a shallow continuous ribbon.

Figure 4:
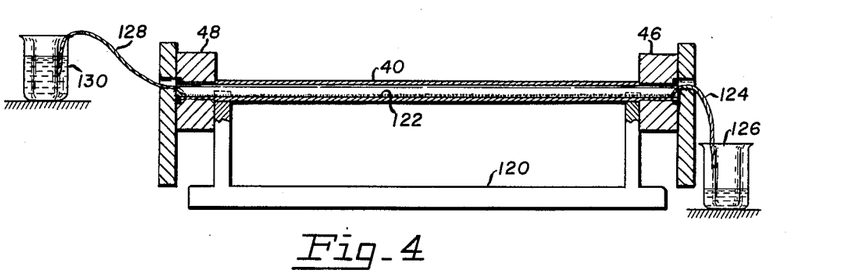
FIG. 4 is an elevational view, partly in cross section of the sedimentation tube in a horizontal rack for draining and washing the ribbon.

Because the transverse settling distance is short, the maximum distance being the diameter of tube 40, settling and clarification of the dispersion fluid is comparatively rapid. After a few minutes, sedimentation tube 40 with its contents may be carefully transferred to a horizontal rack 120 such as shown in FIG. 4, thereby freeing sedimentation apparatus 10 for further tests.

If additional tests are to be conducted with the same sample of powdery material, a clean sedimentation tube is inserted into the system and pressure is introduced into outer jacket 82 to squeeze inner tube 80 until the volume expelled from inner tube 80 is equal to the fluid volume necessary to fill the new sedimentation tube. Since four separate tests are required with a twelve inch long sedimentation tube to cover particle size determination from 128 to 1.0 micron, the variable volume tube permits these tests to be conducted with the same sample of powdery material and the same dispersion fluid.

The clarification step, that is complete transverse sedimentation should be carried out as nearly as possible at the axial sedimentation temperature to prevent generation of fluid convection currents which cause axial transfer of the particles and thereby disturb the distribution set up by the controlled axial sedimentation.

After clarification is complete, that is the dispersion fluid is clear, it is found that the sedimented particles, also referred to as the record, form a well-knit shallow ribbon 122 on the lower inner wall of tube 40. To remove the sedimentation fluid, valves 46 and 48 may be slightly opened and a wick 124 inserted at one end. The wick gradually drains the fluid in tube 40 into a receptacle 126 without disturbing the ribbon 122 also referred to as the record. In case of use of a liberal quantity of dispersing agent, ribbon 122 may be washed by the wick method by adding a cleansing agent 130 at one end by a wick 128 and draining fluid from the other end until the record is clean.

Figure 5:
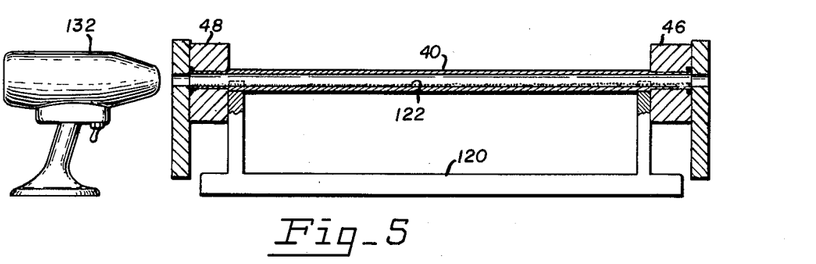
FIG. 5 is a view similar to FIG. 4, showing the drying of the ribbon.

Once the record or ribbon is clean and nearly dry, valves 46 and 48 are fully opened and a stream of hot air may be blown through tube 40 by a blower 132 to dry the ribbon completely as shown in FIG. 5. It has been found that the ribbon of sedimented material is very sturdy and coherent and not subject to axial shifting. After the ribbon is dried, valves 46 and 48 are withdrawn and any solids clinging thereto are saved for weighing.

Figure 10:
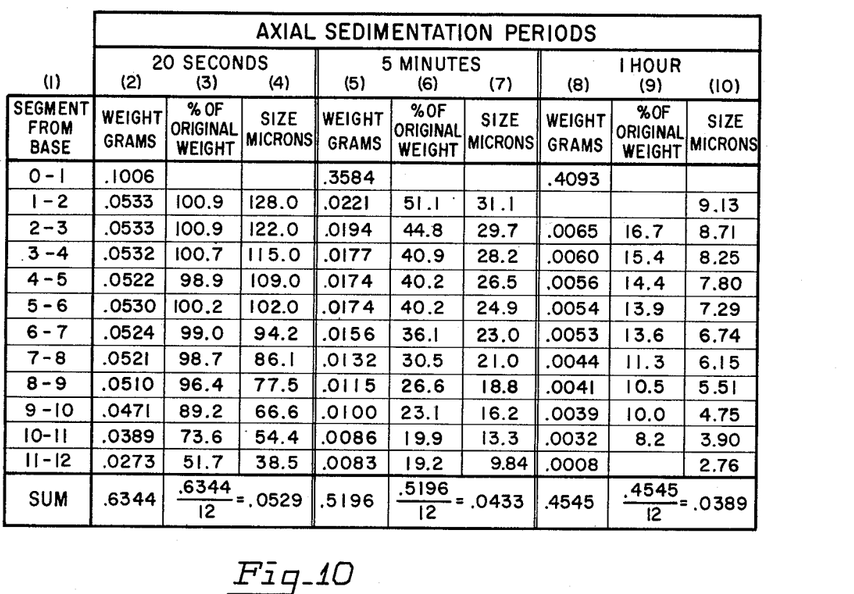
FIG. 10 is a table containing the experimental data for determining the particle size distribution of a powdery material.

Thereafter tube 40 with the sedimentation ribbon 122 clinging to its lower peripheral side is transferred to a cutting rack 134 as shown in FIG. 6 and axially positioned by bracket 136 and 137 to a fixed distance from a knife edge 138. Thereafter, the record is cut into ribbon segments of equal length, each segment being carefully weighed after being cut and withdrawn, the weight being noted together with the position of the ribbon segment in tube 40. By way of example, tube 40 may be exactly 12 inches long and each ribbon segment may be selected as one inch so that twelve record segments are obtained. As shown in FIG. 10, the first column designates the position of the record segment, the segment 0–1 identifying the lowest one inch segment when tube 40 was subjected to controlled axial sedimentation.

To assure that all ribbon segments are cut to the same length, a hoe 140 may be utilized including a semicircular knife blade 142 at its end and a handle 144 having equal spaced notches 146, one inch apart, for engaging the blade 138. Blade 142 is carefully ground to have the same radius as sedimentation tube 40 so that ribbon segments are easily cut and pulled out by hoe 140 to drop into a dish 148 which is then weighed. FIGS. 7 and 8 show details of blade 142.

The theory and method for analyzing the particle distribution from the twelve ribbon segments will now be given together with the criteria which determines the controlled sedimentation period.

As is well known, a body of spherical shape moving through a fluid under the force of gravity is opposed by forces due to the viscosity of the fluid. As soon as the body reaches a constant speed, the forces acting upon the body are balanced. In accordance to Stokes' law, the constant velocity V in cm./sec. is related to the diameter of the body D in microns by the equation:

$$D = K(T)\sqrt{V} \text{ and } K(T) = \frac{18\mu}{g(\delta-\rho)} 10^{-6}$$

where $K(T)$ is a temperature dependent constant, $\delta$ is the density of the powdery material, $\rho$ is the density of the dispersing fluid, $g$ is the gravitational acceleration, and $\mu$ is the viscosity of the dispersing fluid. FIG. 9 is a graph showing the value of $K(T)$ as a function of temperature for dolomite $CaMg(CO_3)_2$ suspended in dispersing agent comprising water with sodium hexa meta phosphate disperser added.

A graph such as shown in FIG. 9 is easily constructed from an experimental determination of the viscosity and density of the dispersing fluid at different temperatures. Assuming that the temperature at which the below described experiment is carried out is 15° centigrade, it is found from FIG. 9 that $K(T)$ is equal to 108 so that $$D = 108\sqrt{V}$$

For very accurate analysis, it is necessary to make certain corrections to take care of effects not included in Stokes' law. For example, when the Reynolds number of a particle in free fall exceeds 1.0 (100 micron dolomite) it begins to fall more slowly than indicated by Stokes' law and correction curves must be consulted. Such correction curves can be found in Zahm, A.H.: Flow and Drag Formulas for Simple Quadratics, T.H. 253, N.A.C.A., U.S. Printing Office, 1927.

For example, a particle of dolomite of 150 microns falls about 12% slower than indicated by Stokes' law.

In case of narrow sedimentation tubes, the following narrow tube correction should be made:

$$V(\text{actual}) = \frac{V \text{ (Stokes' law)}}{1 + 2.1 \frac{DP}{DW}}$$

where DW is the diameter of the sedimentation tube and DP is the diameter of the particle. This is a small correction since for a 100 micron particle in a ⅜ inch tube the actual velocity is only 2% lower than the one calculated by Stokes' law. For a 200 micron particle, the velocity decreases by 4%.

Having determined the relationship between the diameter D in microns and the terminal velocity V in centimeters per second of a specific solid particle in a specific sedimentation fluid, the next step in the process is to determine the necessary time of axial sedimentation. Axial sedimentation causes the large diameter particle to fall much faster than the small diameter particles and therefore determines the range of particle size determination. If it is desired to obtain an indication of the amount of particles smaller than a selected size in the sedimentation tube, the process of axial sedimentation must be stopped before all selected size particles have dropped to the bottom. This selection being made beforehand by simple microscopic inspection.

Supposing that it is desired to find the distribution of particles in a range in which the largest particle is 128 microns. Accordingly, the time of axial sedimentation for this range must be sufficiently long for all particles of size greater than 128 microns to be removed from all but the lowest ribbon segment. If the sedimentation tube is 12 inches long and the sedimentation ribbon is to be cut up into 12 equal segments, the 128 micron particle on the very top end of the sedimentation tube must travel a full 11 inches to reach the beginning of the lowest one inch segment.

Neglecting corrective factors, the terminal velocity of the 128 micron particle of dolomite is $$V = \left(\frac{D}{108}\right)^2 = 1.41 \text{ cm./sec.}$$

and the time taken to travel 11 inches or 28 cm. is 20 seconds. Accordingly, axial sedimentation time is 20 seconds and during this time all particles larger than 128 microns will have accumulated in the lowest one-inch segment.

It is therefore seen that during a 20 second axial sedimentation period all particles above 128 microns will have dropped into the lowest one-inch segment so that weighing that portion and determining the percentage of weight to the average weight in the sedimentation tube provides a measure of the percentage of particles above 128 microns.

This may readily be generalized in terms of the total sedimentation tube length. Suppose the tube is to produce a ribbon which is to be cut into "$n$" equal parts. Each part therefore has a length equal to $1/n$th of the tube length. If it is desired to determine a particle distribution below a preselected size, all particles above the preselected size must be allowed to fall a distance equal to "$n-1$" segments so that they will be in the lowest ribbon section. This distance is equal to $n-1$ segments times the length of each segment i.e., $(n-1) \times 1/n \times$ the tube length. If the tube is 12 inches long and is to be cut in 12 equal ribbon portions of 1 inch each, the particles above the predetermined size must be allowed to fall $11/12$ of 12 inches or 11 inches.

The smallest particle size which can be determined during a 20 second axial sedimentation is similarly calculated. Since the smallest particle must at least fall a distance sufficient to be entirely removed from the first inch portion, the distance travelled during 20 seconds must be equal to 2.54 cm. Since distance $(d)$=velocity × time and velocity=$D^2/K^2$ or $$d = D^2/K^2 \times t$$

therefore $$D = \sqrt{d/t} \times K = 38.5$$

In other words, the first or top one-inch segment is devoid of any particles above 38.5 microns so that its weight as a percentage of the average weight provides a measure of the percentage of particles below 38.5 microns. It is similarly shown that the 2nd, 3rd, 4th, 5th, 6th, 7th, 8th, 9th, and 10th segments from the top are devoid respectively of any particles above 54.4, 66.6, 77.5, 86.1, 94.2, 102, 109, 115 and 122 microns.

The results shown in the following table are calculated as explained above and indicate that a particle size determination over a range of 1 to 128 microns requires four separate axial sedimentation periods as follows:

Table

| Axial Sedimentation Time Duration | Range in Particle Size Covered | |
| --- | --- | --- |
| 20 seconds | 128 | 38.5 |
| 6 minutes | 30 | 9 |
| 1 hour | 9 | 2.7 |
| 7 hours | 3.2 | 1.0 |

Referring now to FIG. 10 there is shown a table including in its various columns the weights and calculations for the determination of size distribution of a powdery sample of dolomite originally dispersed in water with 5% sodium hexa meta phosphate disperser for the range of 2.76 microns to 128 microns. The sedimentation periods were used which were respectively 20 seconds, 5 minutes and 1 hour. The first sedimentation period determined the distribution from 128 to 38.5 microns, the second sedimentation period the distribution from 31.1 to 9.84 microns, and the third sedimentation period the distribution from 9.13 to 2.76 microns.

In FIG. 10 the 1st column lists the segments from the base, there being twelve segments in all. The 2nd, 5th, and 8th column list the weight of the corresponding ribbon segments which are then summed so that the average weight may be determined as shown on the bottom of the figure. The weight of each segment is then expressed in percentage of the average weight and inserted respectively in the 3rd, 6th, and 9th column. The 4th, 7th, and 10th columns represent the calculated value of the largest size particle of which the respective segment is devoid. For example, during the 5 minute axial sedimentation period all particles above 26.5 microns have left the 2–3 segment and entered the 3–4 segment.

Figure 11:
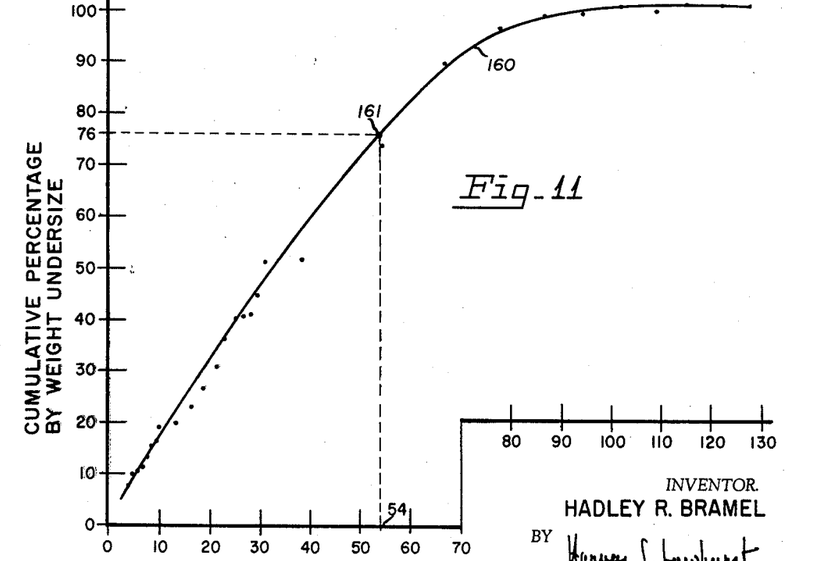
FIG. 11 is a graph with a curve constructed from the data of the table shown in FIG. 10 providing the particle size distribution by cumulative percentage by weight undersize for each particle size.

The percentage of original weight of columns 3, 6 and 9 are then plotted against the calculated particles size of columns 4, 7 and 10 as shown by curve 160 in FIG. 11. The abscissa is selected for plotting particle size and the ordinate then represents the cumulative percentage of particles by weight under the size. For example, 76% of all particles are below 54.0 microns as indicated by print 161 in the graph of FIG. 11.

There has been described hereinabove a new and novel sedimentation apparatus and method for determining the particle size distribution of powdery materials for particles from below 1 micron to above 150. The method provides for a uniform dispersion of the powdery material in a dispersion fluid completely at rest and without gases which would rise and disturb the quiet column prior to the commencement of sedimentation. The dispersed material is then allowed to settle axially for a selected time period after which all sedimentation is arrested and the distribution caused by such incomplete sedimentation is fixed into a ribbon. The ribbon is cut into segments of equal length and weighted to provide simple data for particle size determination.

What is claimed is:

1. A method for determining the particle size distribution of a powdery material comprising the steps of:
   (a) adding said powdery material to the fluid of a closed circulatory fluid system having a vertically tubular portion;
   (b) dispersing said powdery material evenly through the fluid by circulating the fluid through said fluid system;
   (c) bringing the circulating fluid to a complete rest after said powdery material is evenly distributed by shutting off circulation and letting a first time period elapse after shutting off circulation, said first time period being sufficiently long for all vortices and bubbles to die out;
   (d) isolating a section of said vertical tubular portion at the end of said first time period to define a sedimentation tube;
   (e) permitting axial sedimentation of the dispersed powdery material in the sedimentation tube for a second time period which commences with the isolation, said second time period being selected to provide a desired distribution of particles in the sedimentation tube; and
   (f) arresting said axial sedimentation immediately after the end of said second time period by turning said sedimentation tube to a horizontal position so that the powdery material settles to form a ribbon along the lower length of the sedimentation tube which ribbon provides data useful for determining the particle size distribution of said powdery material.

2. A method for determining the particle size distribution of a powdery material comprising the steps of:
   (a) adding said powdery material to the fluid of a closed circulatory fluid system which includes a vertical section having an upper, a center, and a lower portion separated by valving;

(b) dispersing said powdery material evenly through the fluid by pumping the fluid through the closed circulatory fluid system;

(c) arresting fluid flow by discontinuing pumping;

(d) permitting the fluid to come to a complete rest by letting a first time period elapse after arresting fluid flow, said first time period being sufficiently long for all vortices to die out and sufficiently short for maintaining an even dispersion of powdery material in the center portion of the vertical section;

(e) closing said valving at the end of said first time period to isolate the center portion of the vertical section from said circulatory system to form a sedimentation tube;

(f) permitting axial sedimentation of the evenly dispersed powdery material in the sedimentation tube for a second time period which commences with the closing of said valving, said second time period being selected in accordance with the largest particle size of the particle size distribution to be determined;

(g) arresting said axial sedimentation immediately after the end of said second time interval by turning said sedimentation tube to the horizontal position;

(h) clarifying the fluid in said sedimentation tube by letting the powdery material settle to form a ribbon along the length of the sedimentation tube; and (i) cutting the ribbon into portions of equal length and weighing the ribbon portions to arrive at data useful for the determination of the particle size distribution of said powdery material.

3. A method for determining the particle size distribution of a powdery material comprising the steps of:

(a) adding said powdery material to the fluid of a closed circulatory fluid system in which said powdery material is insoluble, the enclosed circulatory fluid system being selected to include a vertical section having an upper, a center, and a lower portion separated by valving;

(b) dispersing said powdery material evenly through the fluid by pumping the fluid through the closed circulatory fluid system;

(c) arresting fluid flow to bring the same to rest;

(d) permitting any vortices in the fluid to die out by letting a first time period elapse after arresting fluid flow, said first time period being sufficiently long for the fluid to come to a complete rest, the upper portion of the vertical section being selected of sufficient length so that during said first time period substantially none of the particles of said powdery material fall a distance greater than the length of the upper portion;

(e) closing the valving at the end of said first time period to isolate the center portion of the vertical section from said circulatory system to form a sedimentation tube;

(f) commencing axial sedimentation of the dispersed powdery material in the sedimentation tube for a second time period which begins with the closing of the valving, said second time period being selected to permit all particles above but none below a preselected size located at the upper extremity of the sedimentation tube to free fall into a region at the bottom of said sedimentation tube of preselected axial length;

(g) arresting said axial sedimentation immediately after the end of said second time period by turning said sedimentation tube to a horizontal position; and (h) clarifying the fluid in said sedimentation tube by letting the powdery material settle to form a ribbon along the length of the sedimentation tube, the increasing weights of said ribbon towards the bottom of the sedimentation tube providing an indication of the particle distribution of said powdery material.

4. A method for determining the particle size distribution below a preselected size of a powdery material comprising the steps of:

(a) adding said powdery material to the fluid of a closed circulatory fluid system in which said powdery material is insoluble and non-flocculating and in which it constitutes less than 5% by weight, the closed circulatory fluid system being selected to include a vertical section having an upper, a center, and a lower portion separated by valving;

(b) dispersing said powdery material evenly through the fluid by pumping the fluid through the closed circulatory fluid system at a rapid rate;

(c) stopping fluid flow;

(d) permitting the fluid to come to a complete rest by letting a first time period elapse after stopping fluid flow, said first time period being sufficiently long for all fluid motion to cease, and the upper portion of the vertical section of the closed circulatory fluid system being selected sufficiently long so that during said first time period substantially none of the particles in said powdery material fall a distance greater than the length of the upper portion;

(e) closing said valving at the end of said first time period to isolate the center portion of the vertical section to form a sedimentation tube, said sedimentation tube defining a plurality of axial regions of equal lengths;

(f) permitting axial sedimentation of the dispersed powdery material in the sedimentation tube during a second time period which commences with the closing of said valving, said second time period being selected to permit all particles above but none below said preselected size located at the upper extremity of the sedimentation tube to free fall into the lowest of the regions in said sedimentation tube;

(g) arresting said axial sedimentation immediately after the end of said second time period by turning said sedimentation tube to a horizontal position;

(h) clarifying the fluid in said sedimentation tube by letting the powdery material settle to form a ribbon along the length of the sedimentation tube;

(i) draining the fluid from the sedimentation tube without disturbing the ribbon and drying the ribbon;

(j) cutting the ribbon into portions corresponding to the regions of the sedimentation tube; and (k) weighing said ribbon portion and comparing the weight of each ribbon portion with the average weight of each ribbon portion to arrive at data useful for the determining of the particle size distribution below said preselected size of said powdery material.

5. A method for determining the particle size distribution of a powdery material comprising the steps of:

(a) introducing said powdery material into a closed circulatory system containing a dispersing fluid and having a vertically extending tubular section separated into an upper, a center and a lower portion by valving;

(b) circulating said fluid through the closed circulatory system until the powdery material is evenly dispersed through the fluid;

(c) bringing the circulatory fluid with the dispersed powdery material to rest and permitting a quieting time period to elapse, said quieting time period being selected sufficiently long to permit all turbulence to cease and sufficiently short to assure that substantially none of the particles of said powdery material free fall a distance greater than the length of said upper portion;

(d) closing said valving at the end of said quieting time period to isolate the center portion from the closed circulatory system to thereby define a sedimentation tube;

(e) axially sedimenting the dispersed powdery material in the sedimentation tube for a preselected axial sedimentation period; and (f) arresting axial sedimentation immediately after the end of said axial sedimentation time period by rotating said sedimentation tube to a horizontal position, the distribution of the powdery material at the end of said axial sedimentation period being determined by its particle size distribution.

6. A method for determining the particle size distribution of a powdery material comprising the steps of:
(a) introducing a sample of powdery material into a closed circulatory system containing a fluid in which said powdery material is insoluble, the closed circulatory system including a vertically extending tubular section separated into an upper, a center, and a lower portion by valving;
(b) circulating said fluid through the closed circulatory system at a rapid rate until the powdery material is evenly dispersed throughout the fluid;
(c) bringing the circulatory fluid with the dispersed powdery material to rest and permitting a quieting time period to elapse, said quieting time period being selected sufficiently long to permit all turbulence to cease and sufficiently short to assure that substantially none of the particles of said powdery material free fall a distance greater than the length of the upper portion of the tubular section;
(d) closing said valving at the end of said quieting time period to isolate the center portion of the tubular section from the closed circulatory system to thereby define a sedimentation tube;
(e) axially sedimenting the evenly dispersed powdery material in the sedimentation tube for an axial sedimentation period commencing with the closing of said valving, said axial sedimentation time period being selected to permit all particles above, but none below, a preselected size located at the upper extremity of the sedimentation tube to free fall a distance greater than a predetermined distance;
(f) arresting said axial sedimentation immediately after the end of said axial sedimentation time period by rotating said sedimentation tube to a horizontal position;
(g) clarifying the fluid in said sedimentation tube by permitting the powdery material to settle and to form a ribbon along the length of the sedimentation tube; and
(h) removing the ribbon to determine its change of weight along its length to derive data useful for determining particle size distribution.

7. A method for determining the particle size distribution below a preselected size of a powdery material comprising the steps of:
(a) introducing a sample of powdery material into a closed circulatory system containing a fluid in which said powdery material is insoluble, the closed circulatory system including a vertically extending tubular section separated into an upper, a center and a lower portion by valving;
(b) circulating said fluid through the closed circulatory system at a rapid rate until the powdery material is evenly dispersed throughout the fluid;
(c) bringing the circulatory fluid with the dispersed powdery material to rest and permitting a quieting time period to elapse, said quieting time period being selected sufficiently long to permit all turbulence to cease and sufficiently short to assure that substantially none of the particles of said powdery material free fall a distance greater than the length of the upper portion of the tubular section;
(d) closing said valving at the end of said quieting time period to isolate the center portion of the tubular section from the closed circulatory system to thereby define a sedimentation tube;
(e) axially sedimenting the evenly dispersed powdery material in the sedimentation tube for an axial sedimentation period commencing with the closing of said valving, said axial sedimentation period being selected to permit all particles above, but none below, said preselected size located at the upper extremity of the sedimentation tube to free fall a predetermined distance, said predetermined distance being selected to be equal to $(n-1)$ $n$ times the total length of the sedimentation tube where $n$ is an integer;
(f) arresting said axial sedimentation immediately after the end of said axial sedimentation period by rotating said sedimentation tube to a horizontal position;
(g) clarifying the fluid in said sedimentation tube by permitting the powdery material to settle and to form a ribbon along the length of said sedimentation tube;
(h) draining the fluid from said sedimentation tube without disturbing the formed ribbon of powdery material;
(i) drying the ribbon of powdery material;
(j) cutting the ribbon into $n$ equal length portions; and
(k) weighing each ribbon portion for comparing the weight of each portion with the average weight of each ribbon portion to arrive at data useful for the determining of particle size distribution of said powdery material.

8. A sedimentation apparatus comprising:
(a) a closed circulatory fluid system including a dispersion fluid, a pumping means for circulating said dispersion fluid, and a vertical tubular section forming a portion of the fluid path and having an axially aligned upper tube, a center tube, and a lower tube;
(b) valve means affixed to the lower end of said upper tube, the upper and lower ends of said center tube, and the upper end of said lower tube, said valve means including valve elements movable between an open and closed position, said upper tube having an axial length selected in accordance with the largest particle in said powdery material;
(c) vertically slidable mounting means for supporting said upper and said lower tube for axial motion in opposite directions between a first position in which said upper and lower tubes are in sealing contact with opposite ends of said center tube and a second position in which said upper and lower tubes are withdrawn from such sealing contact with said center tube; and
(d) pivotal mounting means for supporting said center tube for pivoting between a vertical and horizontal position.

9. A sedimentation apparatus comprising:
(a) a closed circulatory fluid system including a dispersion fluid, a pumping means for circulating said dispersion fluid, and a vertical tubular section forming a portion of the fluid path and having an axially aligned upper tube, a center tube, and a lower tube;
(b) valve means affixed to the lower end of said upper tube, the upper and lower ends of said center tube, and the upper end of said lower tube, said valve means including valve elements movable between an open and closed position, said upper tube having an axial length selected in accordance with the largest particle in said powdery material;
(c) vertically slidable mounting means for supporting said upper and said lower tube for axial motion in opposite directions between a first position in which said upper and lower tubes are in sealing contact with opposite ends of said center tube and a second position in which said upper and lower tubes are withdrawn from such sealing contact with said center tube;
(d) pivotal mounting means for supporting said center tube for pivoting between a vertical and horizontal position;
(e) timing means actuated by at least one valve element of said valve means when moved to its closed position; and (f) means for controlling said pumping means.

10. A sedimentation apparatus in accordance with claim 9 in which said pumping means circulates fluid from said upper tube to said lower tube through said center tube.

11. A sedimentation apparatus in accordance with claim 9 in which the upper end of said upper tube is provided with an opening through which said powdery material is introduced into said circulating system.

12. A sedimentation apparatus in accordance with claim 9 in which a portion of said circulating fluid system includes a pressure operated reservoir for decreasing the fluid capacity of the system to permit repeated removal of a portion of the dispersion fluid and comprising a flexible tube in the fluid path between the outlet port of said pumping means and said upper tube; a pressurizable housing surrounding at least a portion of said flexible tube; and means for pressurizing said housing to compress the fluid capacity of said flexible tube.

13. A sedimentation apparatus in accordance with claim 9 in which said vertically slidable mounting means are simultaneously actuated for motion between said first and second position.

14. A sedimentation apparatus in accordance with claim 9 in which said center tube is detachably mounted to said pivoted mounting means, and in which the valve elements of said valve means are simultaneously moved to their closed position.

15. A sedimentation apparatus for determining the particle size distribution of a powderly material comprising:
 (a) a sedimentation tube having a bore of uniform diameter;
 (b) a valve means at each end of said sedimentation tube having a valve element movable between an open and closed position;
 (c) means for pivotally supporting said sedimentation tube for turning between a vertical and horizontal position;
 (d) an upper and a lower tube having substantially the same diameter bore as said sedimentation tube;
 (e) a valve means having valve elements movable between an open and closed position at the lower end of said upper tube and at the upper end of said lower tube;
 (f) vertically slidable mounting means for mounting said upper and said lower tube respectively above and below said sedimentation tube and in axial alignment therewith when said sedimentation tube is in its vertical position, said mounting means being actuatable to axially move said upper and lower tube into and out of contact with opposite ends of said sedimentation tube;
 (g) fluid pump means having its inflow port in fluid communication with the lower end of said lower tube;
 (h) a collapsable tube connecting the outflow port of said pump means to the upper end of said upper tube, said sedimentation tube, upper tube, collapsable tube and lower tube forming a closed circulatory system; and
 (i) means for introducing a dispersion fluid and said powdery material into said circulatory system.

16. A sedimentation apparatus for determining the particle size distribution of a powdery material comprising:
 (a) a sedimentation tube having a bore of uniform diameter:
 (b) a valve means at each end of said sedimentation tube having a valve element movable between an open and closed position;
 (c) means for pivotally supporting said sedimentation tube for turning between a vertical and horizontal position;
 (d) an upper and a lower tube having substantially the same diameter bore as said sedimentation tube;
 (e) valve means having valve elements movable between an open and closed position at the lower end of said upper tube and at the upper end of said lower tube;
 (f) vertically slidable mounting means for mounting said upper and said lower tube respectively above and below said sedimentation tube and in axial alignment therewith when said sedimentation tube is in its vertical position, said mounting means being actuatable to axially move said upper and lower tube into and out of contact with opposite ends of said sedimentation tube;
 (g) fluid pump means having its inflow port in fluid communication with the lower end of said lower tube;
 (h) a collapsable tube connecting the outflow port of said pump means to the upper end of said upper tube, said sedimentation tube, upper tube, collapsable tube and lower tube forming a closed circulatory system;
 (i) means for introducing a dispersion fluid and said powdery material into said circulatory system; and
 (j) clock means actuated by moving the valve element of at least one of said valve means to its closed position.

17. A sedimentation apparatus for determining the particle size distribution of a powdery material comprising:
 (a) a sedimentation tube having a bore of uniform diameter;
 (b) a valve means at each end of said sedimentation tube having a valve element movable between an open and closed position;
 (c) means for pivotally supporting said sedimentation tube for turning between a vertical and horizontal position;
 (d) an upper and a lower tube having substantially the same diameter bore as said sedimentation tube;
 (e) valve means having valve elements movable between an open and closed portion at the lower end of said upper tube and at the upper end of said lower tube;
 (f) vertically slidable mounting means for mounting said upper and said lower tube respectively above and below said sedimentation tube and in axial alignment therewith when said sedimentation tube is in its vertical position, said mounting means being actuatable to axially move said upper and lower tube into and out of contact with opposite ends of said sedimentation tube;
 (g) fluid pump means having its inflow port in fluid communication with the lower end of said lower tube;
 (h) a pressurible reservoir tube means communicating the outflow port of said pump means with the upper end of said upper tube, said sedimentation tube, upper tube, collapsable tube and lower tube forming a closed circulatory system;
 (i) means for introducing a dispersion fluid and said powdery material into said circulatory system;
 (j) means for pressurizing said reservoir means; and
 (k) clock means actuated by moving the valve element of at least one of said valve means to its closed position.

References Cited in the file of this patent
UNITED STATES PATENTS

| | | |
|---|---|---|
| 2,034,185 | Haultain | Mar. 17, 1936 |
| 2,597,899 | Payne | May 27, 1952 |
| 2,699,673 | Bostock | Jan. 18, 1955 |
| 2,887,227 | Dunham | May 19, 1959 |